(12) United States Patent
Fujiki et al.

(10) Patent No.: US 10,141,727 B2
(45) Date of Patent: Nov. 27, 2018

(54) WIRE HARNESS WITH FIXING MEMBER

(71) Applicant: Sumitomo Wiring Systems, Ltd., Yokkaichi, Mie (JP)

(72) Inventors: Masashi Fujiki, Mie (JP); Hirokazu Nakai, Mie (JP)

(73) Assignee: Sumitomo Wiring Systems, Ltd., Yokkaichi, Mie (JP)

( * ) Notice: Subject to any disclaimer, the term of this patent is extended or adjusted under 35 U.S.C. 154(b) by 0 days.

(21) Appl. No.: 15/439,166

(22) Filed: Feb. 22, 2017

(65) Prior Publication Data

US 2017/0250528 A1  Aug. 31, 2017

(30) Foreign Application Priority Data

Feb. 25, 2016 (JP) ................................. 2016-033828

(51) Int. Cl.

| | |
|---|---|
| *H02G 3/04* | (2006.01) |
| *H01B 7/00* | (2006.01) |
| *B60R 16/02* | (2006.01) |
| *H02G 3/06* | (2006.01) |
| *H02G 3/32* | (2006.01) |

(52) U.S. Cl.
CPC ....... *H02G 3/0406* (2013.01); *B60R 16/0215* (2013.01); *H01B 7/0045* (2013.01); *H02G 3/0462* (2013.01); *H02G 3/0691* (2013.01); *H02G 3/32* (2013.01)

(58) Field of Classification Search
CPC ... H02G 3/0406; H02G 3/0462; H01B 7/0045
See application file for complete search history.

(56) References Cited

U.S. PATENT DOCUMENTS

| | | | |
|---|---|---|---|
| 8,569,622 B2 * | 10/2013 | Katou ................. | B60R 16/0215 138/121 |
| 9,623,815 B2 * | 4/2017 | Adachi .................. | B29C 63/42 |
| 9,680,290 B2 * | 6/2017 | Kimoto ................ | H02G 3/0468 |

FOREIGN PATENT DOCUMENTS

JP  2012178941 A  9/2012

* cited by examiner

*Primary Examiner* — Dhiru R Patel

(74) *Attorney, Agent, or Firm* — Reising Ethington, P.C.

(57) ABSTRACT

A wire harness with a fixing member that is provided can prevent a fixing member from becoming shifted a large amount in the axial direction of a pipe, and enables adjustment of the position of the fixing member. The wire harness includes: a pipe (P) into which electrical wires (W) are inserted; an exterior member that has a bellows portion and surrounds the outer side of at least a portion of the pipe (P) in the axial direction, the bellows portion having mountain portions and valley portions that are successively formed in an alternating manner in the axial direction; and a fixing member that has locking portions, is attached to the exterior member, and is to be fixed to a fixing portion (B). The locking portions are locked to the bellows portion.

3 Claims, 4 Drawing Sheets

WIRE HARNESS WITH FIXING MEMBER

This Application claims the benefit of Japanese Application No. JP2016-033828, filed on Feb. 25, 2016, the contents of which are hereby incorporated by reference in their entirety.

FIELD

The present invention relates to a wire harness with a fixing member.

BACKGROUND

Conventionally, the wire harness disclosed in JP 2012-178941A for example is known as a wire harness for installation in a vehicle or the like. This wire harness includes a pipe into which multiple electrical wires are inserted, and a fixing member that can be fixed to a fixing portion of a vehicle body. The fixing member is attached to the pipe. The pipe has an approximately circular cross-section, and the fixing member includes a gripping portion that is cylindrical and can be fitted around the pipe. After the fixing member is attached to the pipe, the fixing member is fixed to the fixing portion of the vehicle body, thus fixing the wire harness to the vehicle body.

With a configuration in which a cylindrical gripping portion is fitted around a pipe that has a circular cross-section as described above, there is a problem that the fixing member easily becomes shifted in the axial direction of the pipe. If the fixing member becomes shifted a large amount from a predetermined position on the pipe at a stage before attachment of the wire harness to the vehicle body, the position of the fixing member needs to be returned to the predetermined position during the task of attachment to the vehicle body, and this is time-consuming.

However, if some sort of means is used to completely fix the fixing member to the pipe to prevent the fixing member from moving in the axial direction of the pipe, it becomes difficult to accommodate deviations in the relative positional relationship between the fixing portion of the vehicle body and the fixing member of the pipe caused by machine tolerance, assembly tolerance, and the like of the vehicle body and the pipe. If the wire harness is attached without adjusting the position of the fixing member in response to deviation in the relative positional relationship, stress continuously acts on the vehicle body and the pipe, which is not desirable.

SUMMARY

The present design was achieved in light of the above-described circumstances, and an object is to provide a wire harness with a fixing member that can prevent the fixing member from becoming shifted a large amount in the axial direction of the pipe, and enables adjustment of the position of the fixing member.

A wire harness with a fixing member according to a first aspect includes: a pipe into which electrical wires are inserted; an exterior member that has a bellows portion and surrounds an outer side of at least a portion of the pipe in an axial direction of the pipe, the bellows portion having mountain portions and valley portions successively formed in an alternating manner in the axial direction; and a fixing member that has a locking portion, is attached to the exterior member, and is configured to be fixed to a fixing portion, the locking portion being locked to the bellows portion.

A wire harness with a fixing member according to a second aspect includes: a pipe into which electrical wires are inserted; a fixing member that is attached to the pipe and is configured to be fixed to a fixing portion; and exterior members that surround an outer side of the pipe and are arranged on respective sides of the fixing member in an axial direction of the pipe with an interval therebetween in which the fixing member can move.

According to the first aspect, due to the locking portion becoming locked to the bellows portion, it is possible to prevent the fixing member from becoming shifted a large amount in the axial direction of the pipe, and due to the bellows portion expanding or contracting, the position of the fixing member can be adjusted.

According to the second aspect, the pair of exterior members arranged on respective sides of the fixing member can prevent the fixing member from becoming shifted a large amount in the axial direction of the pipe, and the position of the fixing member can be adjusted by movement of the fixing member between the exterior members on the two sides.

DRAWINGS

DESCRIPTION

Figure 1:
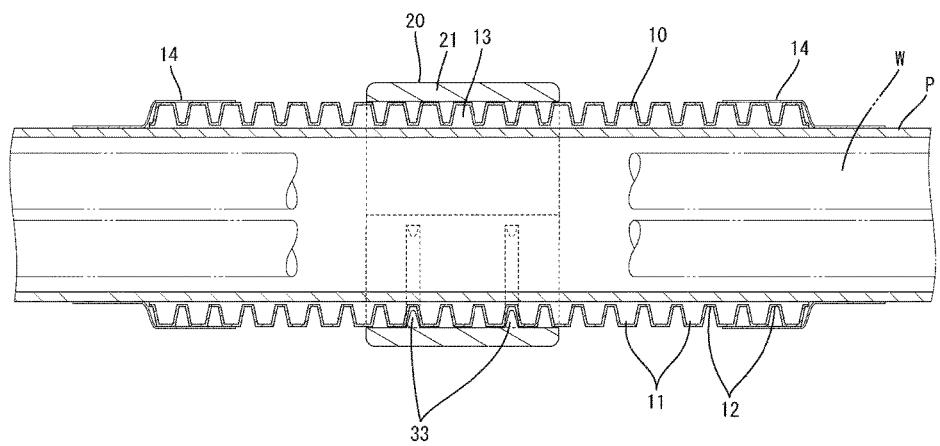
FIG. 1 is a cross-sectional view of a wire harness according to a first embodiment.

Preferred embodiments of the present invention are described below.

In the wire harness with a fixing member, the exterior member may be colored with a color that enables recognition that a high-voltage electrical wire is included therein. Conventionally, a coating with a predetermined color has been applied to the outer circumferential surface of a pipe in order to allow recognition that the wire harness is for a high-voltage application, and the cost for applying the coating to the pipe has tended to be high. However, according to the above configuration, there is no need to apply a coating to the pipe, thus making it possible to achieve a reduction in cost.

Also, the wire harness with a fixing member, may further include a fixing means for fixing an end portion of the exterior member to the pipe. According to this configuration, it is possible to restrict shifting of the exterior member from a predetermined position on the pipe in the axial direction.

First Embodiment

Hereinafter, a first embodiment will be described in detail with reference to FIGS. 1 to 3.

A wire harness with a fixing member (referred to hereinafter as simply a wire harness) of the present embodiment is installed in a vehicle such as an electric automobile or a hybrid automobile, and is routed under the floor of the vehicle body.

The wire harness includes multiple electrical wires W, a pipe P into which the electrical wires W are inserted, an exterior member 10 that surrounds the pipe P, and a fixing member 20 that is attached to the exterior member 10. Connectors (not shown) are connected to terminal portions of the electrical wires W.

The pipe P is made of a metal or a resin, and has approximately the same length as the total length of the electrical wires W. The pipe P has a circular cross-section, and is bent in accordance with the routing path of the wire harness.

The exterior member 10 is made of a synthetic resin, and has a bellows portion 13 in which mountain portions 11 and valley portions 12 are successively formed in an alternating manner in the axial direction. In the present embodiment, the exterior member 10 is a corrugated tube that has the bellows portion 13 over its entire length. The exterior member 10 has a circular cross-section.

The exterior member 10 is arranged at an attachment position on the pipe P where the fixing member 20 is to be attached. The exterior member 10 has a length that is at least greater than the width of the fixing member 20 in the axial direction (width in the left-right direction in FIG. 1). The two end portions of the exterior member 10 in the lengthwise direction are fixed to the pipe P by a fixing means 14, one example of which is wrapping with tape. Accordingly, shifting of the exterior member 10 in the axial direction from a predetermined position on the pipe P is restricted.

The fixing member 20 is attached to the exterior member 10, and is to be fixed to a fixing portion B of the vehicle body. The fixing member 20 is made of a synthetic resin, and has a fitting member 21 that is fitted around the exterior member 10. The fitting member 21 is overall cylindrical with a size capable of being fitted around the exterior member 10 that is attached to the pipe P.

The fitting member 21 has a pair of half bodies 23 that are coupled by a hinge 22. The pair of half bodies 23 can be opened and closed. By opening the pair of half bodies 23, the pipe P can be fitted inside the fitting member 21, and by closing the pair of half bodies 23, the pipe P can be held inside the fitting member 21.

A metal bracket 24, which is to be fixed to the fixing portion B of the vehicle body using bolt fastening or the like, is mounted to the fixing member 20. A mounting portion 25, to which the bracket 24 is mounted, is provided at a position on the side opposite to the hinge 22 relative to the central axis of the fitting member 21. The mounting portion 25 is provided on one half body 23 out of the pair of half bodies 23. The mounting portion 25 has a locking protrusion 27 that can be locked to a locking hole 26 of the bracket 24.

Figure 2:
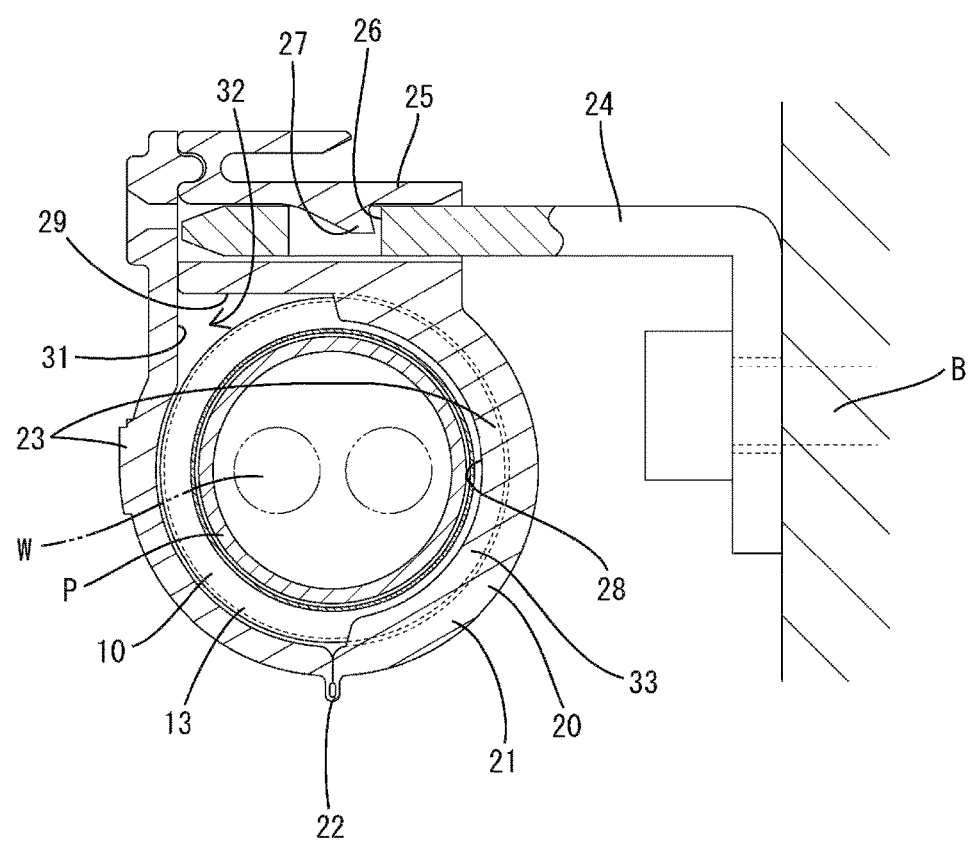
FIG. 2 is a cross-sectional view of the wire harness in a state of being fixed to a fixing portion.
Figure 3:
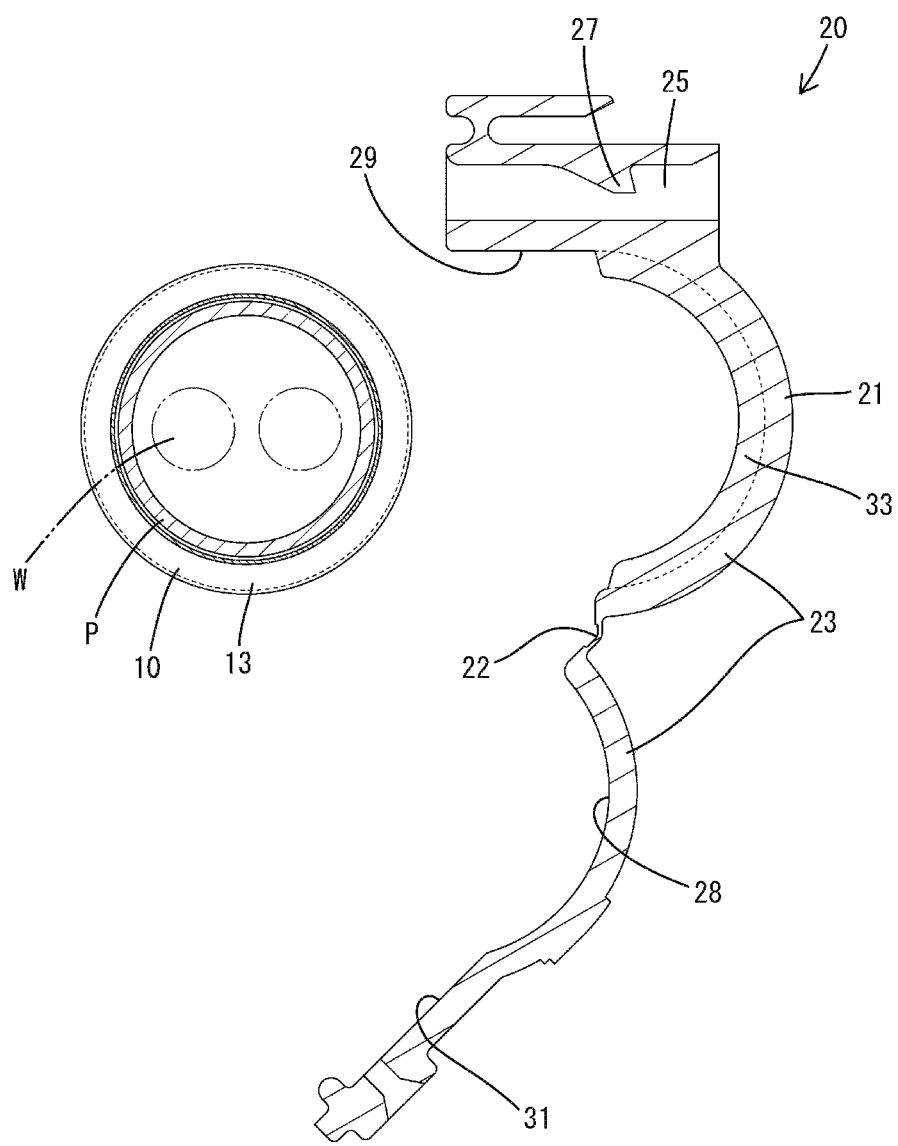
FIG. 3 is a cross-sectional view of attachment of a fixing member to a pipe.

As shown in FIG. 2, the inner circumferential surface of the fitting member 21 has a shape that approximately conforms to the outer shape of the exterior member 10. The inner circumferential surface of the fitting member 21 has a curved surface 28 that is curved in an arc shape along the outer shape of the exterior member 10, a flat first straight surface 29 that is approximately parallel with the attachment direction of the bracket 24, and a second straight surface 31 that is approximately perpendicular to the first straight surface 29. The majority of the inner circumferential surface of the fitting member 21 is constituted by the curved surface 28. The fitting member 21 enters the closed state by the first straight surface 29 abutting against the second straight surface 31. The first straight surface 29 and the second straight surface 31 form a space portion 32 in which the pipe P is not arranged in a corner portion of the fitting member 21.

As shown in FIG. 1, the fixing member 20 has locking portions 33 that are locked to the bellows portion 13 of the exterior member 10. The locking portions 33 protrude from the inner circumferential surface of the fitting member 21. The locking portions 33 are shaped to extend in a continuous manner in the circumferential direction of the fitting member 21. The locking portions 33 are formed on the curved surface 28 of the inner circumferential surface of the fitting member 21. The width of the locking portions 33 in the axial direction of the pipe P gradually decreases toward the protruding end. The protruding end surfaces of the locking portions 33 have a rounded shape. The locking portions 33 enter valley portions 12 of the exterior member 10 and enter a state of being locked to mountain portions 11 that are adjacent on two sides in the axial direction.

The locking portions 33 are provided in a pair, and are separated in the axial direction of the fitting member 21. An interval for multiple (three in the present embodiment) mountain portions 11 is provided between the pair of locking portions 33. Also, the pair of locking portions 33 are provided at positions a predetermined distance inward from the two end surfaces of the fitting member 21 in the axial direction. A distance that allows at least one mountain portion 11 and valley portion 12 is ensured between the end surfaces of the fitting member 21 in the axial direction and the respective locking portions 33.

Next, an example of the task of assembling the wire harness of the present embodiment will be described.

First, the exterior member 10 is attached to the pipe P. The exterior member 10 is moved to a predetermined position on the pipe P, and then the two end portions of the exterior member 10 are fixed to the pipe P by the fixing means 14.

Next, the fixing member 20 is attached to the exterior member 10. As shown in FIG. 3, the pair of half bodies 23 are opened, the exterior member 10 (and the pipe P) is fitted inside the fitting member 21, and then the pair of half bodies 23 are closed. The locking portions 33 of the fixing member 20 enter valley portions 12 of the exterior member 10 and enter a state of being locked to the mountain portion 11 in the axial direction.

The wire harness assembly task is completed as described above.

Next, an example of the task of attaching the wire harness of the present embodiment to the vehicle body will be described.

The fixing member 20 attached to the wire harness is fixed to the fixing portion B of the vehicle body. At this time, the locking portions 33 of the fixing member 20 become locked to the exterior member 10, and the exterior member 10 is fixed to the pipe P, and therefore it is possible to prevent the fixing member 20 from becoming shifted a large amount from the predetermined position on the pipe P. It is therefore possible to eliminate the need for the task of returning the position of the fixing member 20 to the predetermined position.

Also, if a shift occurs in the relative positions of the fixing portion B of the vehicle body and the fixing member 20 of the pipe P, the bellows portion 13 of the exterior member 10 expands or contracts when the fixing member 20 is attached to the fixing portion B, and thus the position of the fixing member 20 is finely adjusted, and the shift in the relative positions is absorbed. It is therefore possible to prevent stress from continuously acting on the pipe P or the vehicle body.

The task of attaching the wire harness to the vehicle body is completed as described above.

Next, actions and effects of the embodiment having the above-described configuration will be described.

The wire harness of the present embodiment includes: the pipe P into which the electrical wires W are inserted; the exterior member 10 that has the bellows portion 13 and surrounds the outer side of at least a portion of the pipe P in the axial direction, the bellows portion 13 having the mountain portions 11 and the valley portions 12 that are successively formed in an alternating manner in the axial direction; and the fixing member 20 that has the locking portions 33, is attached to the exterior member 10, and is to be fixed to the fixing portion B, the locking portions 33 being configured to be locked to the bellows portion 13.

According to this configuration, due to the locking portions 33 being locked to the bellows portion 13, it is possible to prevent the fixing member 20 from becoming shifted a large amount in the axial direction of the pipe P, and due to the bellows portion 13 expanding or contracting, it is possible to adjust the position of the fixing member 20.

Second Embodiment

Next, a wire harness with a fixing member according to a second embodiment will be described.

The wire harness of the present embodiment is different from the first embodiment in that the exterior member 10 has a length capable of surrounding the entire length of the pipe P, and is colored with a color that enables recognizing the fact that high-voltage electrical wires are included therein. Note that configurations similar to those in the first embodiment are denoted by the same reference signs, and redundant descriptions will not be given for them.

Similarly to the first embodiment, the wire harness of the present embodiment includes the pipe P into which the electrical wires W are inserted, the exterior member 10 that has the bellows portion 13 in which mountain portions 11 and valley portions 12 are successively formed in an alternating manner in the axial direction, and the fixing member 20 that has the locking portions 33 that are locked to the bellows portion 13.

The electrical wires W are high-voltage electrical wires, and the pipe P is an uncoated metal pipe.

Similarly to the first embodiment, the exterior member 10 is a corrugated tube that has the bellows portion 13 over its entire length. The exterior member 10 is colored orange as a means for allowing recognition that the wire harness is for a high-voltage application.

As described above, in the present embodiment, similarly to the first embodiment, due to the locking portions 33 being locked to the bellows portion 13, it is possible to prevent the fixing member 20 from becoming shifted a large amount in the axial direction of the pipe P, and due to the bellows portion 13 expanding or contracting, it is possible to adjust the position of the fixing member 20.

Furthermore, the exterior member 10 is colored with a color that enables recognition that high-voltage electrical wires are included therein, and therefore there is no need to apply a coating to the outer circumferential surface of the pipe as in conventional technology in order to allow recognition that the wiring harness is for a high-voltage application. Conventionally, the application of a coating to a pipe is performed at a stage before bending of the pipe, and thus has required many processing steps such as using a bending-resistant coating and cleaning the outer circumferential surface of the pipe before application in order to prevent the coating from detaching in the bent portions of the pipe, and thus cost has tended to rise. However, according to the configuration of the present embodiment, there is no need to apply a coating to the pipe P, thus making it possible to achieve a reduction in cost.

Third Embodiment

Figure 4:
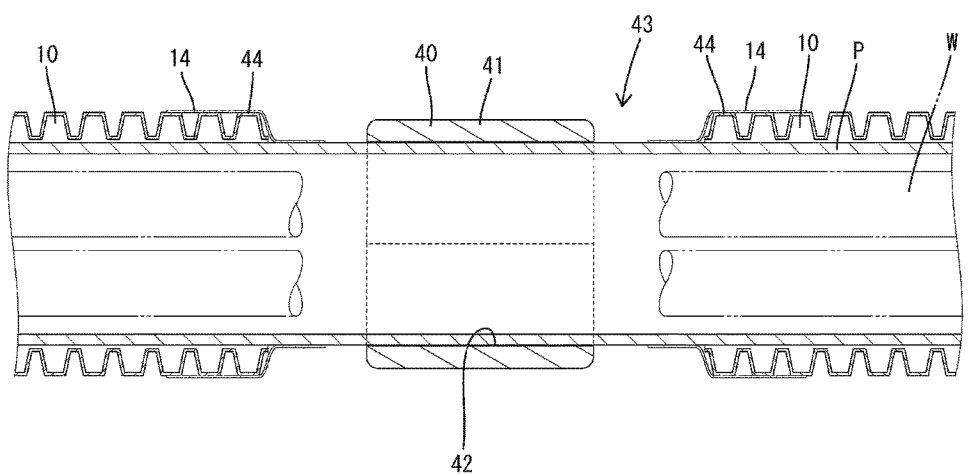
FIG. 4 is a cross-sectional view of a wire harness according to a third embodiment.

Next, a wire harness with a fixing member according to a third embodiment will be described with reference to FIG. 4.

The wire harness with a fixing member of the present embodiment is different from the first embodiment in that the fixing member 40 is attached to the pipe P, and a pair of exterior members 10 that surround the outer side of the pipe P are arranged on respective sides of the fixing member 40 in the axial direction of the pipe P with an interval therebetween in which the fixing member 40 can move. Note that configurations similar to those in the first embodiment are denoted by the same reference signs, and redundant descriptions will not be given for them.

Similarly to the first embodiment, the wire harness with a fixing member of the present embodiment includes the pipe P into which the electrical wires W are inserted, the fixing member 40 that is to be fixed to the fixing portion B, and exterior members 10 that surround the outer side of the pipe P.

The fixing member 40 is made of a synthetic resin, and has a fitting member 41 that is fitted around the pipe P.

The fixing member 40 is a known fixing member, and the locking portions 33 described in the first embodiment are not provided on the inner circumferential surface of the fitting member 41. The fitting member 41 is overall cylindrical with a size capable of being fitted around the pipe P, and the majority of the inner circumferential surface of the fitting member 41 is a curved surface 42 that is curved in an arc shape along the outer circumferential surface of the pipe P. Similarly to the first embodiment, the fitting member 41 has a pair of half bodies that are coupled via a hinge and can open and close, and a metal bracket is provided on the fixing member 40 similarly to the first embodiment.

Similarly to the first embodiment, the exterior member 10 is made of a synthetic resin, and is a corrugated tube that has a bellows portion over its entire length. The pair of exterior members 10 are arranged on respective sides of the attachment position on the pipe P where the fixing member 40 is to be attached. A movement region 43 is ensured between the pair of exterior members 10 such that the fixing member 40 can move in order to accommodate deviation in the relative positional relationship between the fixing portion B of the vehicle body and the fixing member 40 of the pipe P. The pair of exterior members 10 have a length capable of surrounding the entire length of the pipe P, excluding the movement region 43. The two end portions of each of the exterior members 10 in the lengthwise direction are fixed to the pipe P by an arbitrary fixing means 14, similarly to the first embodiment. The end portions of the exterior members 10 that are arranged on the two sides of the movement region 43 configure stopper portions 44 that restrict movement of the fixing member 40.

In the wire harness of the present embodiment, when the fixing member 40 is fixed to the fixing portion B of the vehicle body, the amount of movement of the fixing member 40 is restricted by the stopper portions 44, thus making it possible to prevent the fixing member 40 from becoming shifted a large amount from the predetermined position on the pipe P. Also, if a shift occurs in the relative positions of the fixing portion B of the vehicle body and the fixing member 40 of the pipe P, the fixing member 40 moves in the movement region 43, and thus the position of the fixing member 40 is finely adjusted, and the shift in the relative positions is absorbed.

As described above, in the present embodiment, the fixing member 40 is attached to the pipe P, and the pair of exterior members 10 that surround the outer side of the pipe P are arranged on respective sides of the fixing member 40 in the axial direction of the pipe P with an interval therebetween in which the fixing member 40 can move. Accordingly, the pair of exterior members 10 arranged on the respective sides of the fixing member 40 can prevent the fixing member 40 from becoming shifted a large amount in the axial direction of the pipe P, and the position of the fixing member 40 can be adjusted by movement of the fixing member 40 between the pair of exterior members 10.

OTHER EMBODIMENTS

The present invention is not intended to be limited to the embodiments described using the above descriptions and drawings, and embodiments such as the following examples are also encompassed in the technical scope of the present invention.

Although the case where the exterior member 10 is a corrugated tube is described in the first and second embodiments, the present invention is not limited to this, and it is sufficient that the exterior member has the bellows portion in at least a portion in the lengthwise direction. For example, portions excluding the bellows portion may be straight tube portions that do not have projections or recessions.

Although a specific configuration of the locking portions 33 is illustrated in the first and second embodiments, the present invention is not limited to this, and the shape, number, arrangement positions, and the like of the locking portions can be changed as desired.

Although the case where the exterior members 10 are corrugated tubes is described in the third embodiment, the present invention is not limited to this, and the exterior members may be members that do not have the bellows portion over their entire length.

Although the bracket 24 is mounted to the fixing member 20 in the above embodiments, the present invention is not limited to this, and the fixing member may have any fixing structure that enables fixing to the fixing portion, such as a fixing structure that is pin-shaped and is locked by being fitted into a through-hole in the fixing portion.

Although cases where the present invention is applied to a wire harness for attachment under the floor of a vehicle body are illustrated in the above embodiments, the present invention is not limited to this, and the present invention can be applied to various types of wire harnesses for attachment to a portion that is not under the floor of a vehicle body, or for attachment to something other than a vehicle body.

Although only one fixing member 20 (40) is illustrated in the above embodiments, multiple fixing members may be attached to the pipe.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

REFERENCE SIGNS LIST

B: Fixing portion
P: Pipe
W: Electrical wire
10: Exterior member
11: Mountain portion
12: Valley portion
13: Bellows portion
14: Fixing means
20, 40: Fixing member
33: Locking portion

The invention claimed is:

1. A wire harness, comprising:
   a pipe into which electrical wires are to be inserted, the pipe having an outer surface that is smooth for at least a portion of the pipe in an axial direction;
   an exterior member that has a bellows portion and surrounds the pipe at the portion of the pipe with the smooth outer surface, the bellows portion having mountain portions and valley portions successively formed in an alternating manner in the axial direction; and
   a fixing member that has a locking portion and a mounting portion, is attached to the exterior member at the portion of the pipe with the smooth outer surface, and the mounting portion is configured to be fixed to a fixing portion located on a vehicle body via a bracket, the locking portion being locked to the bellow portion.

2. The wire harness according to claim 1, wherein the exterior member is colored with a color that enables recognition that a high-voltage electrical wire is included therein.

3. The wire harness according claim 1, further comprising a fixing means for fixing an end portion of the exterior member to the pipe.

\* \* \* \* \*